March 22, 1927.
J. FLOTO
BUMPER
Filed Jan. 21, 1926
1,621,501
2 Sheets-Sheet 2
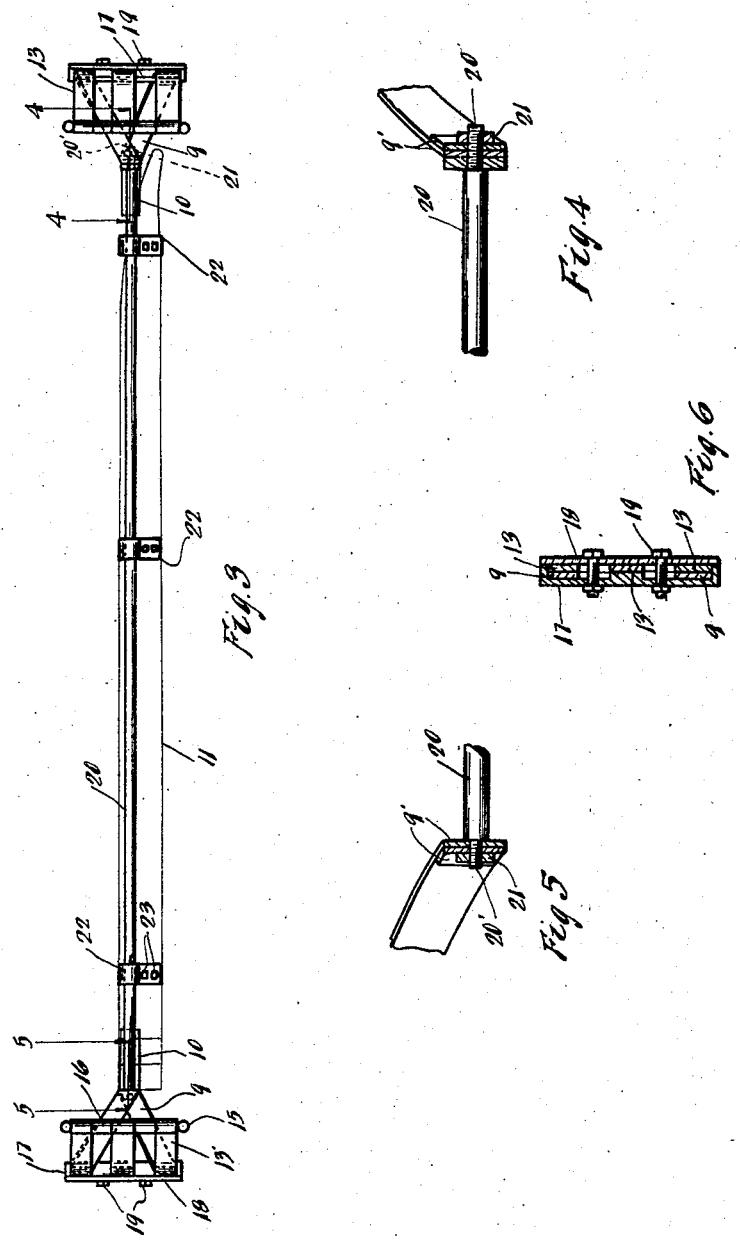

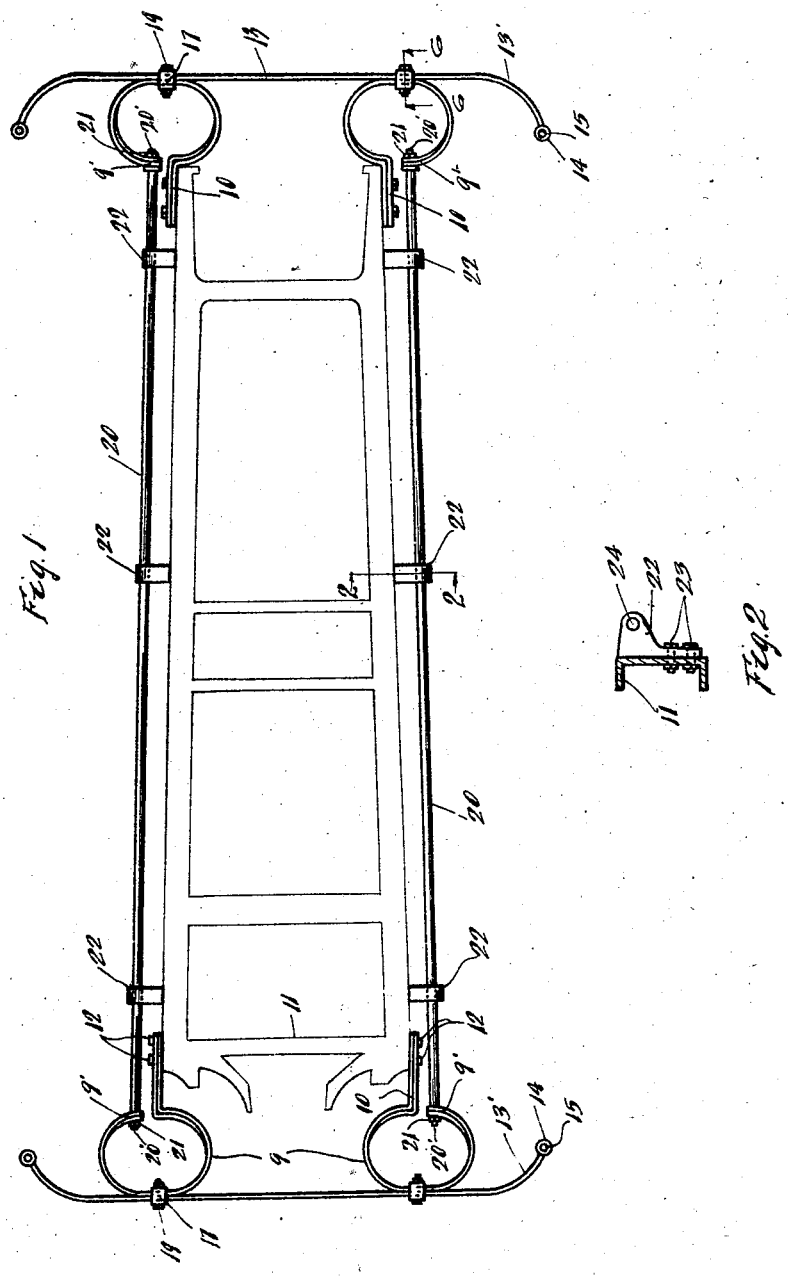

Patented Mar. 22, 1927.

1,621,501

UNITED STATES PATENT OFFICE.

JULIUS FLOTO, OF CHICAGO, ILLINOIS, ASSIGNOR TO JOHN W. TELLING, OF CHICAGO, ILLINOIS.

BUMPER.

Application filed January 21, 1926. Serial No. 82,631.

My invention relates to bumpers, and has for an object to provide resilient bumper means at the front and at the rear of a vehicle and which includes spring means for mounting and supporting the bumper means on the vehicle frame, and further includes thrust means connecting said spring means at the front and at the rear of the vehicle so as to enable both sets of spring means at the front and at the rear of the vehicle to absorb the shock coming on either one of the bumper means.

Other objects will appear hereinafter.

The invention consists in the combinations and arrangements of parts hereinafter described and claimed.

The invention will be best understood by reference to the accompanying drawings forming a part of this specification, and in which, Fig. 1 is a plan view of the preferred form of construction embodying my invention;

Fig. 2 is an enlarged vertical sectional view taken on line 2—2 of Fig. 1;

Fig. 3 is a side elevational view of the invention;

Figs. 4 and 5 are enlarged sectional views taken substantially on lines 4—4 and 5—5 of Fig. 3; and Fig. 6 is an enlarged vertical sectional view taken on line 6—6 of Fig. 1.

The form of construction illustrated comprises bumper means mounted at the front of the vehicle and similar bumper means mounted at the rear of the vehicle, each including a set of curved springs 9 which are arranged substantially circular in form and have one end 10 turned outward and fastened to the vehicle frame 11 as by the use of bolts 12. The bumper preferably includes a plurality of resilient bumper bars 13 having their ends 13' curved inwardly and bent to form knuckles 14 embracing a pin 15 for holding the bars together, while sleeves 16 may be placed between the bars for spacing the same. The bumper bars are preferably fastened to the springs 9, by the use of bracket members 17 provided with plates 18 and bolts 19 for clamping the springs 9 and bars 13 together, as best shown in Fig. 6.

The resilient bumper means or mechanisms, mounted at the front and at the rear of the vehicle, are connected by thrust members, preferably in the form of rods or shafts 20 provided with reduced stems 20' engaging in the free ends 9' of the spring means 9, and nuts 21 are fastened on the ends of said stems to hold the springs on said rods. The rods are slidably supported on the sides of the frame, perferably by the use of brackets 22 fastened on the frame 12 by the use of bolts 23 or the like, and said rods slide through openings 24 in said brackets, as best indicated in Figs. 1 and 2.

This construction provides resilient bumpers and at the same time resilient means or springs for supporting the bumpers resiliently at the front and at the rear of the vehicle, and the rods 20 attached to the free ends 9' of the springs 9 enable the shock, which is brought against one of the bumpers, to be absorbed and resisted by both sets of springs, that is, both sets of bumper means are effective in resiliently resisting the shock coming upon either one of them.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A device of the class described comprising bumper means at the front end and bumper means at the rear end of a vehicle, both being resiliently connected and supported on the vehicle frame, and through uninterrupted thrust means extending between and connecting both of said bumper means for transferring shock from one bumper means to the other.

2. A device of the class described comprising bumper means including resilient means for supporting it at the front and at the rear of the vehicle, and rods extending alongside the frame and connected to both of said bumper means for transferring shock from one of them to the other.

3. A device of the class described comprising a bumper at the front and a bumper at the rear of a vehicle, sets of spring means connecting and supporting said bumpers on the vehicle frame, and members connected to said sets of spring means at the front and at the rear of the vehicle, respectively, to enable both sets of spring means to resist shock coming on either of said bumpers.

4. A device of the class described comprising a bumper at the front and a bumper at the rear of a vehicle, circularly curved springs connected by one end on the vehicle frame, means for connecting said bumpers on said springs, and rods connected to the free ends of said springs to enable both sets of springs to resist shock coming on either one of said bumpers.

5. A device of the class described comprising a bumper construction including sets of circularly curved springs fastened adjacent the corners of the vehicle frame, resilient bumper bars with curved ends mounted on said springs, and bracket means for spacing said bars and fastening them on the springs.

6. In combination with the frame of a vehicle, a bumper construction including sets of curved springs connected by one end to said frame at the front and at the rear of the vehicle respectively, bumper bars mounted on said springs, and members extending from the free ends of the front springs to the free ends of the rear springs to enable both sets of springs to absorb and resist shock on either of the bumpers.

In testimony whereof I have signed my name to this specification.

JULIUS FLOTO.